US010845694B2

(12) United States Patent
Guo et al.

(10) Patent No.: US 10,845,694 B2
(45) Date of Patent: Nov. 24, 2020

(54) LIGHT SOURCE APPARATUS AND PROJECTION SYSTEM

(71) Applicant: APPOTRONICS CORPORATION LIMITED, Guangdong (CN)

(72) Inventors: Zuqiang Guo, Guangdong (CN); Peng Du, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/494,012

(22) PCT Filed: Jul. 4, 2017

(86) PCT No.: PCT/CN2017/091652
§ 371 (c)(1),
(2) Date: Dec. 4, 2019

(87) PCT Pub. No.: WO2018/166120
PCT Pub. Date: Sep. 20, 2018

(65) Prior Publication Data
US 2020/0124952 A1  Apr. 23, 2020

(30) Foreign Application Priority Data

Mar. 14, 2017 (CN) .......................... 2017 1 0150235

(51) Int. Cl.
*G03B 21/20* (2006.01)
*H04N 9/31* (2006.01)
*G02B 27/12* (2006.01)

(52) U.S. Cl.
CPC ......... *G03B 21/208* (2013.01); *G02B 27/123* (2013.01); *G03B 21/204* (2013.01); *H04N 9/3152* (2013.01); *H04N 9/3158* (2013.01)

(58) Field of Classification Search
CPC .............. G03B 21/208; G03B 21/2033; G03B 21/2013; G03B 21/204; H04N 9/3152;
(Continued)

(56) References Cited

U.S. PATENT DOCUMENTS

2015/0267880 A1*  9/2015  Hadrath ............... G03B 21/204
                                                            362/84
2018/0210328 A1*  7/2018  Uehara ............... G02B 27/0961

FOREIGN PATENT DOCUMENTS

| CN | 104111532 A | 10/2014 |
| CN | 104280992 A | 1/2015 |
| CN | 205910481 U | 1/2017 |

OTHER PUBLICATIONS

International Search Report for International Application No. PCT/CN2017/091652, dated Nov. 16, 2017.
(Continued)

*Primary Examiner* — Ryan D Howard
(74) *Attorney, Agent, or Firm* — Marshall, Gerstein & Borun LLP

(57) ABSTRACT

Disclosed is a light source device, including a first light source, a fly-eye lens pair, a light guiding system and a wavelength conversion device. The first light source emits first exciting light. The wavelength conversion device includes a wavelength conversion section and a reflective section. The wavelength conversion section absorbs the first exciting light and emits excited light. The first exciting light is obliquely incident to the reflective section and is reflected to form second exciting light. The light guiding system is also used for collecting the excited light and the second exciting light and guiding them to exit along an exiting light channel. The light guiding system reflects the second exciting light in such a manner that main optical axes of the reflected second exciting light and the excited light coincide.

(Continued)

Lens units perform imaging with overlap on a surface of the wavelength conversion device.

20 Claims, 7 Drawing Sheets

(58) Field of Classification Search
CPC ... H04N 9/3158; H04N 9/3164; H04N 9/3161
See application file for complete search history.

(56) References Cited

OTHER PUBLICATIONS

Written Opinion for International Application No. PCT/CN2017/091652, dated Nov. 16, 2017.

\* cited by examiner

LIGHT SOURCE APPARATUS AND PROJECTION SYSTEM

CROSS-REFERENCE TO RELATED APPLICATION

This is the United States national phase of International Patent Application No. PCT/CN2017/091652, filed Jul. 4, 2017, which claims priority to CN Application No. 201710150235.2, filed Mar. 14, 2017, the entire contents of each of which are hereby incorporated herein by reference.

FIELD OF THE DISCLOSURE

The present disclosure relates to the field of projection technology, and more particularly, to a light source device and a projection system.

BACKGROUND

In the field of projection technology, a semiconductor blue laser is used to excite phosphors to generate red light and green light, and it is a commonly used method to modulate an image by using blue light emitted by the semiconductor blue laser itself and the red light and the green light to form three primary colors.

SUMMARY

Specifically, the present disclosure provides a light source device. The light source device includes a first light source, a fly-eye lens pair, a light guiding system, and a wavelength conversion device; the first light source is configured to emit first exciting light, and the first exciting light is homogenized by the fly-eye lens pair and then incident to the light guiding system; the light guiding system is configured to guide the first exciting light to the wavelength conversion device; the wavelength conversion device includes a wavelength conversion section and a reflective section, the wavelength conversion device periodically moves in such a manner that the wavelength conversion section and the reflective section are periodically located on an optical path of the first exciting light in different time divisions, the wavelength conversion section absorbs the first exciting light and emits excited light, and the first exciting light is obliquely incident to a surface of the reflective section and is reflected to form second exciting light; the light guiding system is further configured to collect the excited light and the second exciting light, and to guide the excited light and the second exciting light to exit along an exiting light channel; the light guiding system includes an optical path correcting assembly, and the optical path correcting assembly is located on an optical path of the second exciting light and configured to reflect the second exciting light in such a manner that a main optical axis of the reflected second exciting light coincides with a main optical axis of the excited light; the fly-eye lens pair includes a first lens array and a second lens array that are sequentially disposed along a direction of the first exciting light, and lens units constituting the first lens array are configured to perform imaging with overlap on a surface of the wavelength conversion device.

The present disclosure provides a projection system, the projection system includes the light source device according to any one of embodiments above, a light modulating device and a lens device.

Advantageous Effects

Compared with the related art, the present disclosure, through guiding of the light guiding system, causes the first exciting light to be obliquely incident to the surface of the reflective section of the wavelength conversion device, such that the reflected second exciting light is separated from the optical path of the first exciting light and does not return on the original path along the optical path of the first exciting light, thereby avoiding that the second exciting light loses part of the light along the optical path of the first exciting light and effectively improving the light utilization rate. The main optical axis position and the light spot imaging position of the second exciting light is corrected by the reflection effect of the optical path correcting assembly of the light guiding system, to change the imaging position of the light spot of the second exciting light perpendicular to the optical path direction thereof, thereby making the second exciting light and the excited light have the same spatial distribution uniformity at a predetermined position. The respective lens units of the first lens array of the fly-eye lens pair are caused to perform imaging with overlap on a surface of the wavelength conversion device by providing the fly-eye lens pair between the first light source and the light guiding system, such that the light spot on the surface of the wavelength conversion device is a superimposing of the imaged light spots of the respective lens units of the first lens array, and the uniformity of the light spot is ensured. Moreover, the fly-eye lens still ensures that the imaging position remains unchanged when the incident light is deflected at a small angle, which avoids a problem of the positional deviation of the light spot caused by the deflection of the first exciting light due to the installation error or the like, thereby further ensuring the uniformity of the light distribution of the light emitted by the light source device.

DESCRIPTION OF EMBODIMENTS

In the present disclosure, descriptions involving "first", "second", "third" and the like are used for descriptive purposes only for convenience of description but should not be understood as indicating or implying their relative importance or implicitly indicating the number of technical features indicated. Thus, features defining "first", "second", and "third" may include at least one of the features, either explicitly or implicitly.

Figure 1:
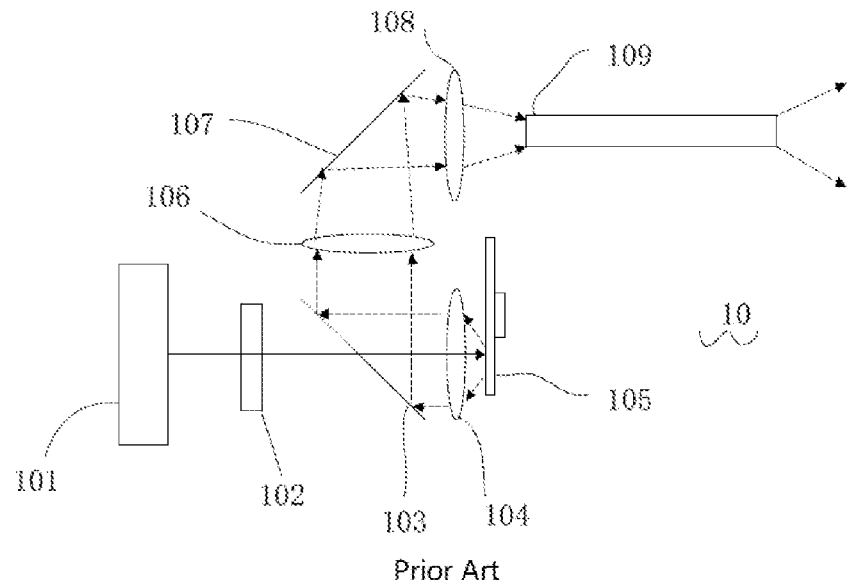
FIG. 1 is a structural schematic diagram of a light source device in the related art.

In the related art, as shown in FIG. 1, the light source device 10 includes a first light source 101, a light homogenizing device 102, a region light splitter 103, a collecting lens 104, a phosphor color wheel 105, a first relay lens 106 and a second relay lens 108, a mirror 107 and a square bar 109.

The first light source 101 is a blue laser, and blue exciting light emitted thereby is homogenized by the light homogenizing device 102 and then incident to the region light splitter 103 and transmitted through a blue-transmitting and yellow-reflective region of the region light splitter 103. The blue light is incident to the collecting lens 104 along a central axis of the collecting lens 104, and it is collected by the collecting lens 104 and then incident to the phosphor color wheel 105. The phosphor color wheel 105 includes a first section coated with a red phosphor, a second section coated with a green phosphor and a third section having a scattering and reflecting function. The phosphor color wheel 105 rotates periodically in such a manner that the first section, the second section, and the third section are located on an optical path of the blue light in different time divisions. The blue light excites the red phosphor to generate a red fluorescence (excited light), and the blue light excites the green phosphor to generate a green fluorescence (excited light), and the red fluorescence and the green fluorescence are emitted in a form of Lambertian light. The blue light is scattered and reflected by the third section and is also emitted in the form of the Lambertian light, and an etendue becomes large. The red fluorescence and the green fluorescence pass through the collecting lens 104 and are reflected by the region light splitter 103; while for the blue light emitted in the form of the Lambertian light, the blue light incident to the blue-transmitting and yellow-reflective region 1031 will be lost due to transmission. The red light, the green light, and the remaining blue light pass through the relay lens 106, the mirror 107, and the relay lens 108 to enter the square bar 109 and are finally emitted from an emission end of the square bar 109. Since a central portion in the beam incident to the square bar 109 lacks the blue light, after it is emitted from the square bar 109, a phenomenon of color unevenness occurs to a surface distribution of a light spot at an exit thereof, and the center portion is yellowish, which will result in uneven color of the finally projected image.

Figure 2:
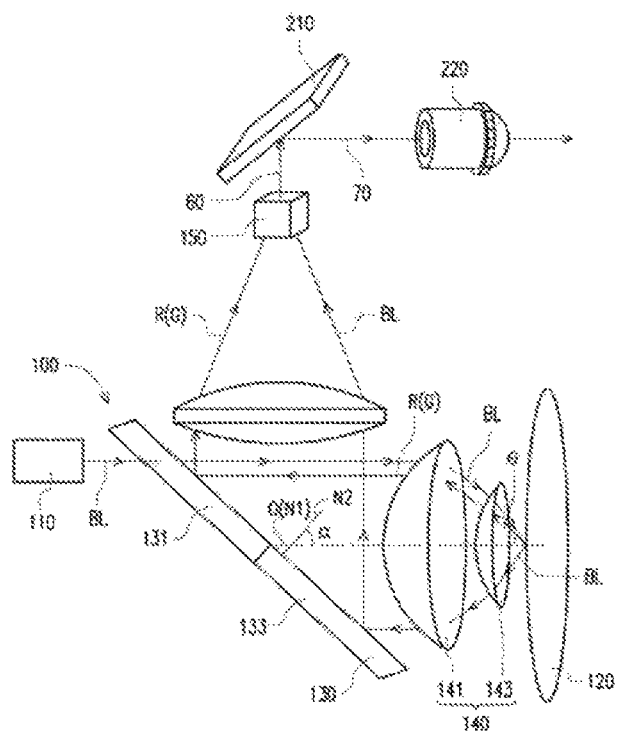
FIG. 2 is a structural schematic diagram of another light source device in the related art.

In another related art CN105278226A, as shown in FIG. 2, the light source device 100 includes a light source 110, a wavelength conversion module 120, a light combining unit 130, a light transferring module 140, and an integrator column 150. The light combining unit 130 includes a light splitting portion 131 and a reflective portion 133. The blue laser BL emitted from the light source 110 is incident to the light transferring module 140 via the light splitting portion 131, and incident to the wavelength conversion module 120 at an angle θ via the light transferring module 140. After being reflected, it is transferred to the reflective portion 133 via the light transferring module 140, and then collected and guided to the integrator column 150 through a lens. In this technical solution, the incident blue light and the emitted blue light are respectively transmitted and reflected by the two parts of the same component light combining unit 130—the light splitting portion 131 and the reflective portion 133, resulting in that the main optical axis of the blue light deviates from the direction of the main optical axis of the emitted light. Therefore, the main optical axes of the red and green lights emitted from the light combining unit 130 do not coincide with the main optical axis of the blue light, which will result in that the color of the light spot at the exit of the integrator column 150 is not uniform and thus result in uneven color of the final projected picture.

Further, the wavelength conversion module 120 is disposed at a focus of the light transferring module 140 to enable the red and green light to be emitted in parallel. In this case, since the light emitted by the light source 110 cannot be strictly parallel light and there is always a certain divergence angle, the light source 110 is necessarily imaged at a certain position after passing through the light transferring module 140, while the beam of the blue light is necessarily in an out-of-focus state in a focal plane of the light transferring module 140. The light in the out-of-focus state inevitably forms a light spot with an uneven surface distribution, and the light spot not only causes the blue light which is finally emitted by the light source device to be uneven, but also results in an uneven surface distribution of the red and green excited lights due to a difference in densities of the exciting lights. Further, when the main optical axis of the incident blue light is slightly deflected, a center of the light spot on the wavelength conversion module 120 deviates from the optical axis of the light transferring module 140, resulting in an uneven distribution of the emitted red, green and blue light.

Therefore, the technical solution of the related art CN105278226A is not practical, which is why the technology has not been applied to actual products.

In view of the above-described drawback in the related art that light source device has poor color uniformity, the present disclosure provides a light source device in which an emitted light has a uniform color distribution.

The basic concept of the present disclosure is as follows. Under the premise that the exciting light is obliquely incident to the wavelength conversion device, a uniform and stable light spot is formed on the wavelength conversion device using the principle of light-homogenizing and imaging of a fly-eye lens pair. Once an imaging relationship from the fly-eye lens pair to the wavelength conversion device is established, the position and uniformity of the light spot on the surface of the wavelength conversion device will not be affected even if the light incident to the fly-eye lens pair is deflected. This concept solves the problem of the uniformity of the light spot in the case where the beam is obliquely incident and obliquely emitted.

This concept is generated in the context of an oblique incidence of a beam of an exciting light. This is because that in a conventional technical solution where an exciting light is incident to the wavelength conversion device perpendicularly, the center of the light spot is always on the optical axis of the optical element such as various lens and there is no need to consider the problem that the light spot is shifted in a direction perpendicular to the optical axis; while the oblique incidence of the beam of the exciting light creates a new problem, that is, at different positions along the direction of the optical axis of the lens, distances by which the light spot on a cross-section perpendicular to the optical axis offsets from the optical axis are different, and deflection angles of the light rays incident from different positions of the lens are different, so that obtaining a uniform light spot on the surface of the wavelength conversion device becomes a problem.

In the present disclosure, a main optical axis of a beam can be understood as a central axis of the beam, and a direction of the main optical axis is a direction in which the beam advances.

In the present disclosure, a "coincidence" of main optical axes of two beams can be understood as an approximate coincidence/a coincidence within a precision error range instead of a coincidence in an absolute sense. Those skilled in the art can understand that, based on the technical solutions provided by the present disclosure, a technical solution in which the main optical axes of the two beams are parallel and an interval is smaller than a threshold is also within the protection scope of the present disclosure, and such technical solution may also be referred to as "a coincidence within the error range".

The embodiments of the present disclosure will be described in detail below with reference to the accompanying drawings and embodiments.

Embodiment 1

Figure 3:
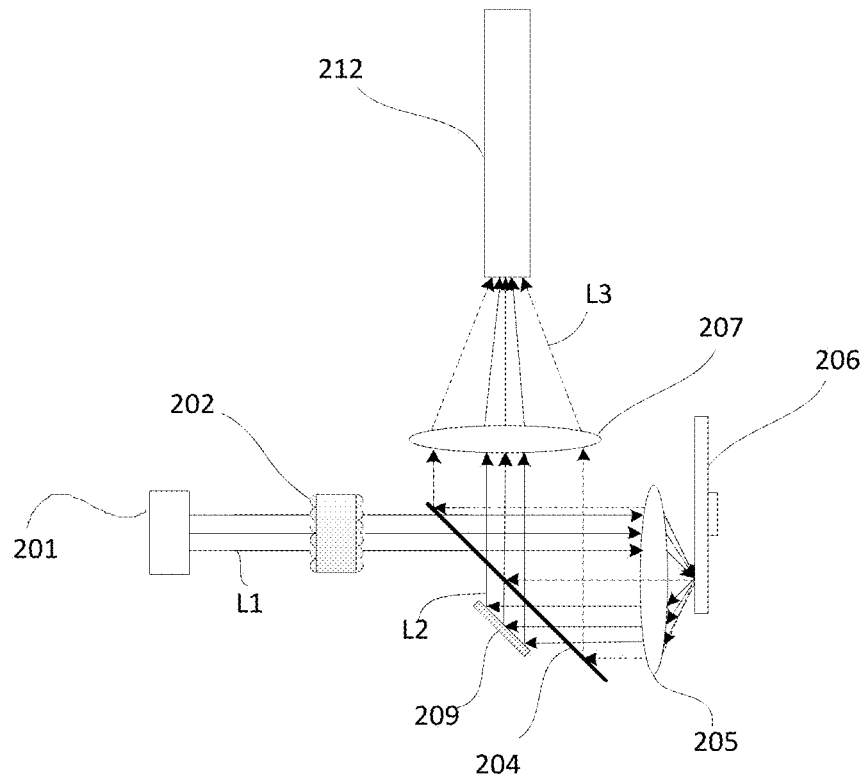
FIG. 3 is a structural schematic diagram of a light source device according to Embodiment 1 of the present disclosure.

Referring to FIG. 3, FIG. 3 is a structural schematic diagram of a light source device according to Embodiment 1 of the present disclosure. The light source device includes a first light source 201, a fly-eye lens pair 202, a light guiding system, and a wavelength conversion device 206. The light guiding system includes a first light splitting assembly 204, a collecting lens 205, a relay lens 207, and an optical path correcting assembly 209. In addition, the light source device further includes an integrator rod 212.

In this embodiment, the first light source 201 emits first exciting light L1. The first exciting light L1 is homogenized by the fly-eye lens pair 202 and then it is incident to the light guiding system, so that it is guided to the wavelength conversion device 206. Specifically, the first exciting light L1 is transmitted through a first region of the first light splitting assembly 204 of the light guiding system, and then it is converged by the collecting lens 205 and incident to the wavelength conversion device 206.

The wavelength conversion device 206 includes a wavelength conversion section and a reflective section. The wavelength conversion device 206 periodically moves in such a manner that the reflective section and the wavelength conversion section are periodically located on an optical path of the first exciting light L1 in different time divisions. The wavelength conversion section absorbs the first exciting light L1 and emits excited light L3. The first exciting light L1 is obliquely incident to a surface of the reflective section and is reflected to form second exciting light L2. The wavelength conversion section includes a wavelength conversion material or a wavelength conversion structure and can absorb the exciting light and emit excited light having a wavelength different from that of the exciting light. Under an action of the wavelength conversion section, the excited light is substantially in a Lambertian distribution, and a direction of a main optical axis is perpendicular to the wavelength conversion section, while the reflective section does not change an angular distribution of the exciting light. The angular distributions of the first exciting light and the second exciting light are substantially the same, and the second exciting light L2 is symmetrically emitted with respect to the first exciting light L, and the emission direction is not perpendicular to the reflective section. Therefore, the main optical axes of the excited light L3 and the second exciting light L2 do not coincide, and the excited light L3 and the second exciting light L2 propagate along two different optical paths.

The light guiding system is further used to collect the excited light L3 and the second exciting light L2 and guide the excited light L3 and the second exciting light L2 to exit along an exiting light channel, as follows.

When the wavelength conversion section of the wavelength conversion device 206 is on the optical path of the first exciting light L1, the excited light L3, after being emitted by the wavelength conversion section, is collected by the collecting lens 205 and transferred to the first light splitting assembly 204. The first light splitting assembly 204 has different transmission-reflection characteristics for the first exciting light L1 and the excited light L3 such that the excited light is reflected and guided to exit along the exiting optical path.

When the reflective section of the wavelength conversion device 206 is on the optical path of the first exciting light L, the second exciting light L2, after being emitted by the reflective section, is collected by the collecting lens 205 and transferred to a second region of the first light splitting assembly 204. The second exciting light L2 has the same wavelength as that of the first exciting light L1. The second exciting light L2 is transmitted through the second region of the first light splitting assembly 204 and transferred to the optical path correcting assembly 209. In this embodiment, the regions of the first light splitting assembly 204, on which the first exciting light L1 and the second exciting light L2 are incident, do not overlap (the first region does not overlap with the second region), so the second exciting light L2 does not return to the first light source 201 in a reverse direction on the original path along the incidence optical path of the first exciting light L1. The optical path correcting assembly 209 is located on an optical path of the second exciting light L2. The second exciting light L2 incident to the optical path correcting assembly 209 is reflected by a reflective surface of the optical path correcting assembly 209, such that the main optical axis of the reflected second exciting light L2 coincides with the main optical axis of the excited light L3. The reflected second exciting light L2 is again transmitted through the first light splitting assembly 204, combined with the excited light L3 into one beam (which means a coincidence of the optical paths of the two, and actually, the two are staggered in time) at a position of the first light splitting assembly 204 where the excited light is emitted, and converged by the relay lens 207 so as to be incident to the integrator rod 212.

As described above, the first exciting light L1 is symmetric with the second exciting light L2. When analyzing from the symmetry of the optical paths, the beam incident to the collecting lens 205 and the reflected beam emitted through the collecting lens 205 are symmetrical about its central axis. Therefore, when the first exciting light L1 is facing away from the central axis of the collecting lens 205, the second exciting light L2 is also facing away from the central axis. Separation of the two beams of light can give a larger space for optical design and structural design, but since in actual applications the larger the angle of view, the worse the image quality, when the first exciting light L1 incident to the collecting lens 205 is facing away from the central axis of the collecting lens 205, its image quality on the surface of the wavelength conversion device 206 is relatively poor, resulting in uneven illumination of a light spot. Thus, when the light spot is used to excite the phosphor, the excitation efficiency of the phosphor will be largely reduced. For the sake of a light spot imaging aberration and uniformity, it is desired that the incident first exciting light L1 can be as close as possible to the central axis of the collecting lens 205 or the first exciting light L1 and the second exciting light L2 can be as close as possible, but the second exciting light L2 emitted from the collecting lens 205 and the first exciting light L1 and the optical path correction unit 209 cannot be made overlap.

In this embodiment, by providing a fly-eye lens pair before the light guiding system, the first exciting light L1 incident to the fly-eye lens pair is adjusted, thereby adjusting and correcting a direction of the first exciting light L1 incident to the light guiding system.

Figure 4:
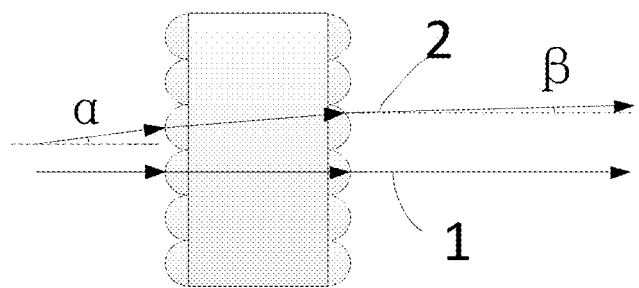
FIG. 4 is a schematic diagram showing a principle of an angle correction of a fly-eye lens pair.

FIG. 4 is a schematic diagram showing a principle of an angle correction of a fly-eye lens pair, and the fly-eye lens pair has a good function of correcting the optical path. When the beam 1 is incident along an optical axis parallel with the fly-eye lens pair, the direction of the main optical axis of the emitted light remains unchanged and is still parallel with the optical axis of the fly-eye lens pair. When the beam 2 is incident at an angle $\alpha$ relative to the optical axis of the fly-eye lens pair, the main optical axis of the beam 2 of the emitted light is at an angle $\beta$ with the optical axis of the fly-eye lens pair, $\alpha>\beta$. That is, the fly-eye lens pair has a function of reducing an inclination angle of the beam. For example, when $\alpha$ is about 1° and $\beta$ is about 0.2°, a magnitude of the angle $\beta$ of the emitted light can be adjusted by adjusting a magnitude of $\alpha$, and an adjustment accuracy is higher than an accuracy in the case where $\beta$ is adjusted directly, such that a distance between an edge of the beam of the first exciting light L1 incident to the collecting lens 205 and the central axis of the collecting lens 205 can be as small as possible. In the practical application of the present disclosure, the distance between the edge of the beam of the first exciting light L1 incident to the collecting lens 205 and the central axis of the collecting lens 205 can be controlled to be within a range of 0.2 to 0.5 mm, thereby greatly improving the imaging quality of the light spot on the surface of the wavelength conversion device 206 and providing basic conditions for a subsequent uniform light distribution on an exiting surface of the entire light source device.

In addition to the function of the angle correction, the fly-eye lens pair also has a function of making the light spot be imaged uniformly. In the present embodiment, the fly-eye lens pair 202 includes a first lens array and a second lens array which are sequentially disposed in the direction of the first exciting light L1. The first lens array and the second lens array are respectively composed of a plurality of one-to-one corresponding lens units. Optical axes of the two lens arrays are parallel, and a focus of the lens unit of the first lens array coincides with a center of the corresponding lens unit in the second lens array. Each lens unit of the second lens array overlapping-images the corresponding lens unit in the first lens array in an infinity position, and then the overlapped images at the infinity position are overlapping-imaged, by an action of other lenses in the light source device, on the surface of the wavelength conversion device 206. Briefly, the respective lens units constituting the first lens array are overlapping-imaged on the surface of the wavelength conversion device. This technical solution, by superimposing the imaged light spots of the respective lens units, eliminates and compensates an influence of the potential unevenness of certain light spots on the total light spot, which provides a guarantee for the subsequent uniform light distribution on an exiting surface of the entire light source device. In addition, since an imaging process is from the fly-eye lens pair to the surface of the wavelength conversion device, once an imaging relationship is established, an object, an image, and a lens are determined. Thus, even if the light incident to the fly-eye lens pair is deflected, the light spot position and uniformity on the surface of the wavelength conversion device will not be affected (only the light distribution of the beam before or after the imaging position is affected).

The above is a basic technical solution of Embodiment 1 of the present disclosure. On the basis of the above, a variety of specific technical solutions can be derived from the respective assemblies of the light source device of the present disclosure based on the actual application environment, and the various technical solutions can be combined with each other, which will be exemplified by following examples.

In one embodiment, the first light source 201 can be a blue laser or an array of blue lasers. The first exciting light L1 is blue laser, and the laser has a smaller divergence angle, a concentrated beam and a substantial Gaussian distribution, such that the optical path of the reflected second exciting light L2 can be easily distinguished from that of the first exciting light L1. In another embodiment, the first light source 201 can be a LED emitting blue light and the first exciting light is blue LED light. The present disclosure is not limited thereto. In one embodiment, the first exciting light has a small divergence angle.

In this embodiment, the wavelength conversion device 206 is a wheel-disk structure (a fluorescent color wheel). The wavelength conversion section and the reflective section are arranged in a fan-ring shape on the wheel-disk structure and driven by a driving device (such as a motor) to rotate around a central axis of the wheel-disk. In another embodiment, the wavelength conversion device may also be a fluorescent color barrel/color cylinder and includes a wavelength conversion section and a reflective section which are distributed around a barrel/cylinder surface. The color barrel/color cylinder rotates around its axis direction so that different sections are periodically illuminated by the exciting light in different time divisions. Alternatively, the wavelength conversion device may be a fluorescent color plate and includes a wavelength conversion section and a reflective section which are sequentially arranged in a straight-line direction. The color plate linearly vibrates in the straight-line direction, such that the different sections are periodically illuminated by the exciting light in different time divisions, so as to emit sequential light.

In one embodiment, the wavelength conversion section of the wavelength conversion device 206 includes a fluorescent material layer. The fluorescent material layer may be a phosphor-organic adhesive layer (separate phosphors are bonded into a layer by an organic adhesive such as silica gel or epoxy resin) or a phosphor-inorganic adhesive layer (separate phosphors are bonded into a layer by an inorganic adhesive such as glass), and it may also be fluorescent ceramics (including 1) a structure in which a continuous ceramic is used as a substrate and phosphor particles are distributed in the ceramic; 2) a pure phase ceramic doped with an activator element, such as YAG ceramics doped with Ce; 3) on the basis of the pure phase ceramic doped with an activator element, the phosphor particles are dispersed in the ceramic). In another embodiment, the wavelength conversion section includes a quantum dot layer and plays a photoluminescence role by a quantum dot material. The wavelength conversion device 206 can have only one wavelength conversion section (such as a yellow wavelength conversion section) or have only two wavelength conversion sections (such as a green wavelength conversion section and a red wavelength conversion section), and it may also include more than two wavelength conversion sections.

In one embodiment, the reflective section of the wavelength conversion device 206 includes a metal reflective surface that specular-reflects the exciting light. In another embodiment, the reflective section includes a dielectric reflective film and specular-reflects the exciting light. In other embodiments of the present disclosure, the reflective sections may also employ other reflective structures to reflect the exciting light.

In the present embodiment, the reflective surface of the reflective section of the wavelength conversion device 206 is parallel with a motion plane of the wavelength conversion device 206. That is, the rotation axis of the fluorescent color wheel is perpendicular to the reflective surface of the reflective section. In order to achieve that the first exciting light is incident to the surface of the wavelength conversion device in an oblique incidence manner (when the reflective section is located on the optical path of the first exciting light, the reflective surface of the reflective section is the surface of the wavelength conversion device), the first exciting light is incident to the collecting lens 205 at a position deviating from the center of the collecting lens 205, such that the first exciting light has a light transferring direction changed by the collecting lens 205, and thus it is obliquely incident to the surface of the wavelength conversion device. Subsequently, the second exciting light reflected from the reflective section is incident to the collecting lens 205. Between the collecting lens 205 and the wavelength conversion device 206, the first exciting light L1 and second exciting light L2 form a "V"-shaped optical path.

In this embodiment, the first light splitting assembly 204 is a filter sheet/filter film/dichroic color film that transmits the exciting light (including the first exciting light and the second exciting light) and reflects the excited light. The first light splitting assembly 204 is sufficiently large in such a manner that the light from the collecting lens 205 can be reflected towards the relay lens 207 and the sufficiently large first and second regions that are separated from each other can be used for the transmission of the first exciting light and the second exciting light, respectively.

In the present embodiment, the optical path correcting assembly 209 includes a planar reflective surface that is implemented by plating a metal reflective film on a substrate plate. In other embodiments, it may be achieved by plating a dielectric reflective film or the like.

In one embodiment, the collecting lens 205 can be formed by a combination of a plurality of lenses.

In one embodiment, the relay lens 207 can be formed by a combination of a plurality of lenses, such as a combination of concave lenses and convex lenses, and the like. It will be understood that the relay lens is not a requisite assembly of the light source device of the present disclosure.

In the present embodiment, the emitted light of the relay lens 207 is incident to the incidence surface of the integrator rod 212. In other embodiments, the integrator rod 212 can also be replaced with other light homogenizing devices. In other embodiments, the integrator rod 212 may also be omitted so that the emitted light directly enters the subsequent optical element, which is not limited in the present disclosure.

Embodiment 2

Figure 5:
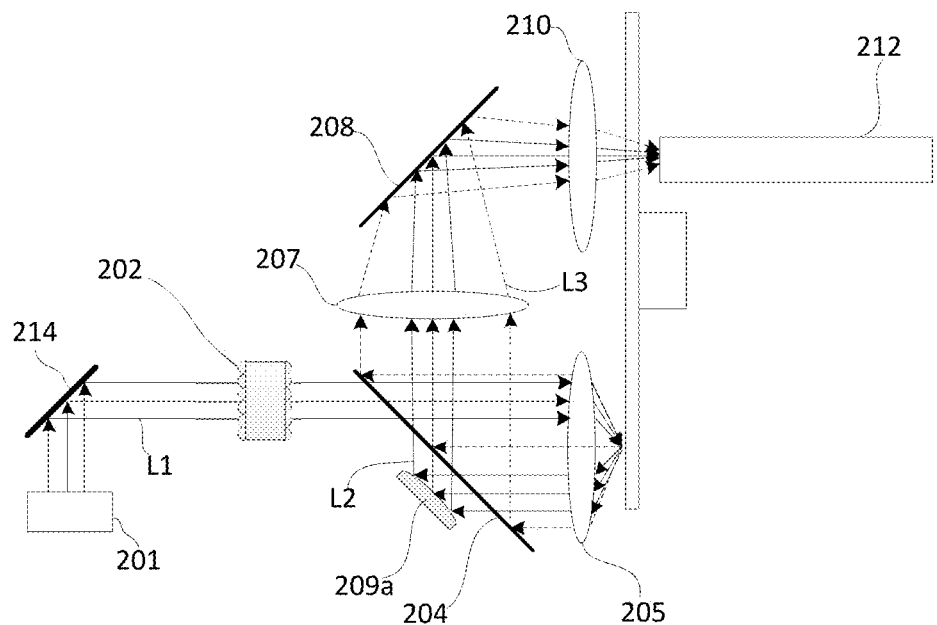
FIG. 5 is a structural schematic diagram of a light source device according to Embodiment 2 of the present disclosure.

Referring to FIG. 5, FIG. 5 is a structural schematic diagram of a light source device according to Embodiment 2 of the present disclosure. The light source device includes a first light source 201, a fly-eye lens pair 202, a light guiding system, and a wavelength conversion device 206. The light guiding system includes a first light splitting assembly 204, a collecting lens 205, a first relay lens 207, a second relay lens 210, a reflective sheet 208, and an optical path correcting assembly 209a. Further, the light source device further includes an integrator rod 212, a filter wheel 211, and a beam angle reflective sheet 214.

Compared with Embodiment 1, there are several differences in this embodiment, and the respective difference may exist as an independent feature combined with Embodiment 1 or other modified embodiments to become an implementable technical solution of the present disclosure.

Firstly, a first difference is as follows. The first exciting light L1 emitted by the first light source 201 in Embodiment 1 is directly incident to the fly-eye lens pair 202. In this case, it is difficult to adjust a beam angle of the first exciting light L1 incident to the fly-eye lens pair 202. However, in this embodiment, a beam angle reflective sheet 214 is disposed between the first light source 201 and the fly-eye lens pair, and the first exciting light L1 is reflected by the beam angle reflective sheet 214 and is then incident to the fly-eye lens pair 202. The beam angle reflective sheet 214 can be adjusted before the light source device product leaves a factory, so as to control an angle at which the first exciting light L1 is incident to the fly-eye lens pair 202, and make the first exciting light L1 as close as possible to the central axis of the collecting lens 205. Then, the beam angle reflective sheet 214 is fixed by dispensing or the like. The technical solution improves the product yield of the light source device, simplifies the production process, and has very important practicality.

In one embodiment, the beam angle reflective sheet 214 is rotated by a certain angle on the basis of being disposed at 45° with respect to the first exciting light L1 emitted from the first light source 201, such that an included angle between the incident and emitted rays of the first exciting light L1 at the beam angle reflective sheet 214 is made larger than 90°. This technical solution tilts the beam, thereby reducing the likelihood of the beam overlapping the optical path correcting assembly 209a. In addition, as long as a position of the fly-eye lens pair does not move, and only the path through which the light passes during imaging moves, the image quality will not be significantly affected.

In one embodiment, the beam angle reflective sheet 214 does not rotate by more than 1° with respect to 45°, such that the included angle between the incident and emitted rays of the first exciting light at the beam angle reflective sheet 214 is made larger than 90° and not larger than 92°, that is, the included angle between the first exciting light reflected by the beam angle reflective sheet 214 and the axis of the fly-eye lens pair is made larger than 0° and not larger than 2°, and the direction of the first exciting light is emitted in a direction facing away from the central axis of the collecting lens 205. Within this angle range, the emitted light has good uniformity. If the rotation angle of the beam angle reflective sheet 214 is too large and thus the tilt angle of the light that has been reflected thereby exceeds an allowable range of the fly-eye lens pair F #, then the one-to-one correspondence between the first lens array and the second lens array of the fly-eye lens pair is broken, resulting in side lobes. In this embodiment, since the beam angle reflective sheet 214 changes the inclination angle of the first exciting light L1 before it is incident to the collecting lens 205, such that the inclination angle of the second exciting light L2 emitted through the collecting lens 205 is also changed. In order to make the main optical axes of the second exciting light L2 and the excited light L3 coincide, a placement angle of the optical path correcting assembly 209a also changes, to make the included angle between the second exciting light incident to the optical path correcting assembly 209a and the second exciting light emitted from the optical path correcting assembly 209a larger than 90°.

Secondly, a second difference is as follows. In this embodiment, the filter wheel 211 is added. In this embodiment, the optical path from the fly-eye lens pair 202 to the first relay lens 207 is substantially the same as that in Embodiment 1 (except for the section of the optical path correcting assembly 209a to be described later). The difference lies in that the light from the first relay lens 207, before entering the integrator rod 212, is reflected by a reflective sheet 208 at first to change the direction, and then it is incident to the filter wheel 211 via the second relay lens 210. The light transmitted through the filter wheel 211 enters the integrator rod 212.

In the present embodiment, the filter wheel 211 includes a scattering-transmitting section and a color-retouching transmitting section. The scattering-transmitting section is for scattering the second exciting light L2, to make the divergence angle of the second exciting light L2 coincide with the divergence angle of the excited light L3. The scattering-transmitting section can be implemented by providing a scattering sheet. The color-retouching transmitting section is used to perform color retouching on the excited light in such a manner that a color coordinate of the transmitted excited light conforms to requirements on the emitted light of the light source device. The color-retouching transmitting section can be implemented by providing a wavelength filter. The filter wheel 211 is driven by a driving device (such as a motor) to periodically rotate, so that the filter wheel 211 is synchronized with the wavelength conversion device 206, to make respective sections of the filter wheel 211 be in one-to-one correspondence with respective sections of the wavelength conversion device 206. Specifically, when the wavelength conversion device 206 emits the excited light, the color-retouching transmitting section of the filter wheel 211 is located on the optical path of the excited light; and when the wavelength conversion device 206 emits the second exciting light, the scattering-transmitting section of the filter wheel 211 is located on the optical path of the second exciting light. Since after the exciting light is scattered by a general scattering sheet, the angular distribution of the exciting light is of Gaussian scattering, which is different from the angular distribution of the excited light. Therefore, in order to make the angular distribution of the exciting light that has been scattered be consistent with that of the excited light, in some embodiments, the scattering-transmitting section is provided with a Top-hat type scattering sheet (that is, the angular distribution after scattering is approximately in a " Л " shape and appears like a top hat, so that it is called a top-hat) or a single-row fly-eye structure arranged in a hexagon. In the present disclosure, since the reflective section of the wavelength conversion device 206 does not scatter or reflect the exciting light, a light distribution of the exciting light and a light distribution by the excited light are largely different, while providing the scattering-transmitting section of the filter wheel can improve the difference in the light distribution.

Figure 6:
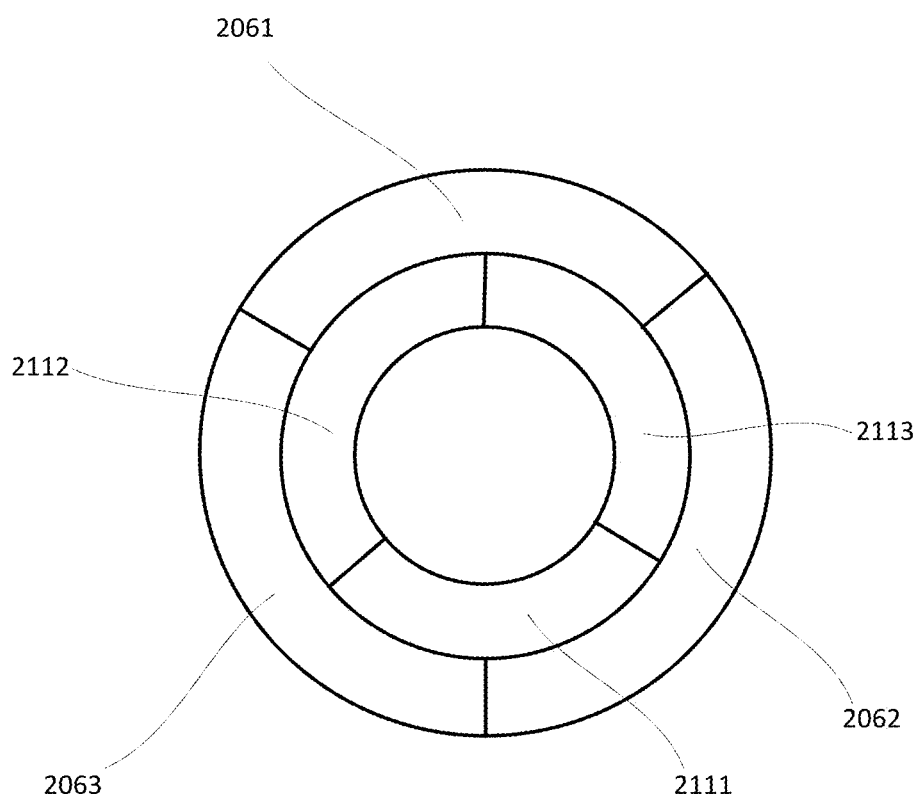
FIG. 6 is a structural schematic diagram of a wavelength conversion device according to the present disclosure.

Specifically, in this embodiment, the filter wheel 211 and the wavelength conversion device 206 are disposed coaxially and formed into one piece, and they rotate around the same axis under the driving of the same driving device. As shown in FIG. 6, the wavelength conversion device 206 includes a fan-ring-shaped reflective section 2061, a red wavelength conversion section 2062, and a green wavelength conversion section 2063. The filter wheel 211 includes a fan-ring-shaped scattering-transmitting section 2111, a red color-retouching transmitting section 2112, and a green color-retouching transmitting section 2113. A fan-ring angle of the reflective section 2061 is the same as a fan-ring angle of the scattering-transmitting section 2111. A fan-ring angle of the red wavelength conversion section 2062 is the same as a fan-ring angle of the red color-retouching transmitting section 2112. A fan-ring angle of the green wavelength conversion section 2063 is the same as a fan-ring angle of the green color-retouching transmitting section 2113. In this embodiment, the reflective region 2061 is disposed at 180° opposite to the scattering-transmitting region 2111, and this technical solution makes the reflective region 2061 be farthest from the scattering-transmitting region 2111, so that there is sufficient space to arrange optical elements of an intermediate optical path. Without doubt, in other embodiments, the reflection region and the scattering-transmitting region may be disposed at an arbitrary angle of 0 to 180°, which is not limited in the present disclosure.

It can be understood that the filter wheel and the wavelength conversion device can also be independently arranged and driven by different driving devices, and their positions are not necessarily arranged on one plane. Moreover, the filter wheel is not an essential assembly of the light source device of the present disclosure, so in the case where requirements on the color coordinate or the angular distribution of the emitted light is relatively low or the color coordinate of the emitted light of the light source itself is close to a demanded application scene, the filter wheel may be omitted, which is not limited in the present disclosure.

Finally, a third difference is as follows. The optical path correcting assembly 209 Embodiment 1 is a planar reflective surface, while in this embodiment, an optical path correcting assembly 209a includes a convex reflective surface. The convex reflective surface faces the second exciting light, reflects the second exciting light, changes the angular distribution of the beam and diverges the beam. A position of the optical path correcting assembly 209a is the same as that in Embodiment 1 and is also disposed on the side of the first light splitting assembly 204 facing away from the wavelength conversion device 206.

In the present embodiment, in addition to enabling the main optical axis of the second exciting light L2 to be coincident with the main optical axis of the excited light L3 by reflecting, the optical path correcting assembly 209a has a function of diverging the beam by varying the angular distribution of the beam of the second exciting light.

In this embodiment, the optical path correcting assembly 209a is disposed on the side of the first light splitting assembly 204 facing away from the wavelength conversion device 206, and the main optical axis of the second exciting light from the optical path correcting assembly 209a, after passing through the first light splitting assembly 204, coincides with the main optical axis of the excited light. Relative to the excited light, an optical-distance of the second exciting light from the wavelength conversion device 206 to a coincidence position (here, it still refers to the coincidence of the spatial positions of the second exciting light and the excited light, and actually second exciting light and the excited light are staggered in time) of the second exciting light and the excited light is larger than an optical-distance of the excited light, and an optical-distance of the second exciting light from the wavelength conversion device 206 to an incidence surface of the integrator rod 212 is larger than an optical-distance of the excited light from the wavelength conversion device 206 to the incidence surface of the integrator rod 212. Considering an optical element between the wavelength conversion device and the integrator rod as an imaging device and according to an imaging formula of $1/u+1/v=1/f$, if it is required to make imaging positions of the second exciting light and the excited light the same, then it is necessary to increase a focal length f of the imaging device of the second exciting light, and this function can be achieved by adding a concave lens or a convex lens on the optical path of the second exciting light. The optical path correcting assembly 209a in the present embodiment includes a convex reflective surface, which increases an imaging focal length of the second exciting light from the wavelength conversion device to the integrator rod and thus enables the second exciting light and the excited light to be imaged at the same position, thereby achieving the spatial distribution uniformity of the emitted light of the light source device.

In one embodiment, the convex reflective surface of the optical path correcting assembly 209a is a structure in which a metal reflective film is plated on a convex structure. In other embodiments, it may also be achieved by plating a dielectric reflective film or the like.

For the optical processing on the beam performed by various optical elements, the beam transferring process, and the like, which are not described in this embodiment, reference may be made to the description in Embodiment 1, and details are not described herein again.

Embodiment 3

Figure 7:
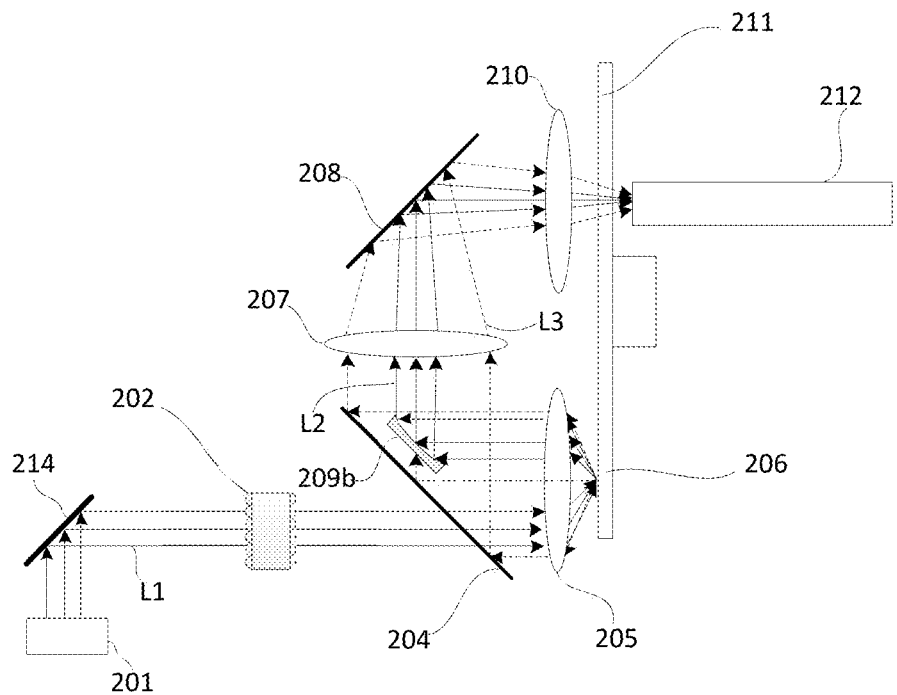
FIG. 7 is a structural schematic diagram of a light source device according to Embodiment 3 of the present disclosure.

FIG. 7 is a structural schematic diagram of a light source device according to Embodiment 3 of the present disclosure. The light source device includes a first light source 201, a fly-eye lens pair 202, a light guiding system, and a wavelength conversion device 206. The light guiding system includes a first light splitting assembly 204, a collecting lens 205, a first relay lens 207, a second relay lens 210, a reflective sheet 208, and an optical path correcting assembly 209b. Further, the light source device further includes an integrator rod 212, a filter wheel 211, and a beam angle reflective sheet 214.

A difference between this embodiment and Embodiment 3 is that the type and position of the optical path correcting assembly 209b change.

In this embodiment, the optical path correcting assembly 209b is an optical element including a concave reflective surface, and it is disposed on the side of the first light splitting assembly 204 close to the wavelength conversion device 206. Moreover, the second exciting light emitted from the reflective section of the wavelength conversion device 206 is not incident to the first light splitting assembly 204, but directly reflected by the concave reflective surface of the optical path correcting assembly 209b. Moreover, the optical path correcting assembly 209b is capable of transmitting the excited light, and it can be achieved by plating a filter film, which transmits the exciting light and reflects the second exciting light, on a concave surface of a transparent medium.

In this embodiment, the second exciting light L2 is reflected by the optical path correcting element 209b before reaching the first light splitting assembly 204. After being reflected, it coincides with the optical path of the main optical axis of the excited light L3, such that relative to the excited light, an optical-distance of the second exciting light from the wavelength conversion device 206 to a coincidence position of the second exciting light and the excited light is smaller than an optical-distance of the excited light from the wavelength conversion device 206 to the coincidence position of the second exciting light and the excited light. Thus, an optical-distance from a light spot-imaging of the reflective section of the wavelength conversion device 206 to the incidence surface of the integrator rod 212 is smaller than an optical-distance of a light spot-imaging of the wavelength conversion section of the wavelength conversion device 206 to the incidence surface of the integrator rod 212. According to the imaging formula of $1/u+1/v=1/f$, if it is required to make the imaging positions of the second exciting light and the excited light the same, it is necessary to reduce the imaging focal length f of the second exciting light. By providing the optical path correcting assembly 209b including the concave reflective surface, the imaging focal length is reduced, so that the second exciting light and the excited light can be imaged at the same position, thereby achieving the spatial distribution uniformity of the light emitted from the light source device.

Compared with the technical solution in which the optical path correcting assembly includes the convex reflective surface in Embodiment 2, in the technical solution of this embodiment, part of the excited light is required to pass through the optical path correcting assembly, which causes the uniformity of the excited light to be inevitably affected somewhat. However, since the second exciting light is light having a small divergence angle, an area of the optical path correcting assembly is relatively small. Therefore, in some applications where the requirements are relatively low, the technical solution of the present embodiment can also be accepted.

In this embodiment and Embodiment 2, the optical path correcting assemblies all include curved reflective surfaces, and a common point is that the angular distribution of the beam can be adjusted. In the present disclosure, a process of the light from the wavelength conversion device 206 to the incidence surface of the integrator rod 212 is actually a process from the light spot imaging on the surface of the wavelength conversion device 206 to the incidence surface of the integrator rod 212 (the integrator rod can also be replaced with other optical devices; moreover, the light spot on the surface of the wavelength conversion device is imaged to an incidence surface of the replaced optical device). Since the optical paths of the second exciting light L2 and the excited light L3 are different and the optical-distances of the two are different before their main optical axes coincide, their imaging positions do not coincide under the action of passing through the same optical devices after the coincidence of their optical paths, which results in poor spatial uniformity of one of the second exciting light and the excited light (because the light spot on the wavelength conversion device as "an object" is uniform, while the light spot whose imaging position deviates from the integrator rod 212 is in an out-of-focus state on the incidence surface of the integrator rod 212, the surface distribution of the light spot is necessarily uneven. By adding an optical path correcting assembly having a beam angular distribution adjusting function, the second exciting light is converged or diverged once again, so that the imaging position of the second exciting light can be made coincident with the imaging position of the excited light.

In other embodiments of the present disclosure, the curved reflective surface structure of the optical path correcting assembly can be replaced with a combination of a planar reflective surface and a lens, to achieve the same function. In one embodiment, the convex reflective surface is replaced by a combination of a planar reflective surface and a concave lens, such that not only the second exciting light can pass through the concave lens first and then be incident to the planar reflective surface, but also the second exciting light can be reflected by the planar reflective surface first and then transmitted through the concave lens. In another embodiment, the concave reflective surface is replaced by a combination of a planar reflective surface and a convex lens, such that not only the second exciting light can pass through the convex lens first and then be incident to the planar reflective surface, but also the second exciting light can be reflected by the planar reflective surface first and then transmitted through the convex lens.

It can be understood that on the basis of the curved reflective surface, one or more planar reflective surfaces can be further added and formed into the optical path correcting assembly together with the curved reflective surface, as long as the main optical axis of the second exciting light after the last reflection is coincident with the main optical axis of the excited light.

The structures above, such as the convex reflective surface, the planar reflective surface, the convex lens plus the planar reflective surface, the concave lens plus the planar reflective surface, can all be collectively referred to as an angular distribution correcting element and used to emit or converge a beam, and all their functions are to make the imaging positions, in the direction of beam propagation, of the second exciting light and the excited light coincide.

For the optical processing on the beam performed by various optical elements, the beam transferring process, and the like, which are not described in this embodiment, reference may be made to the description in Embodiment 3, and details will not be described herein again.

Embodiment 4

Figure 8:
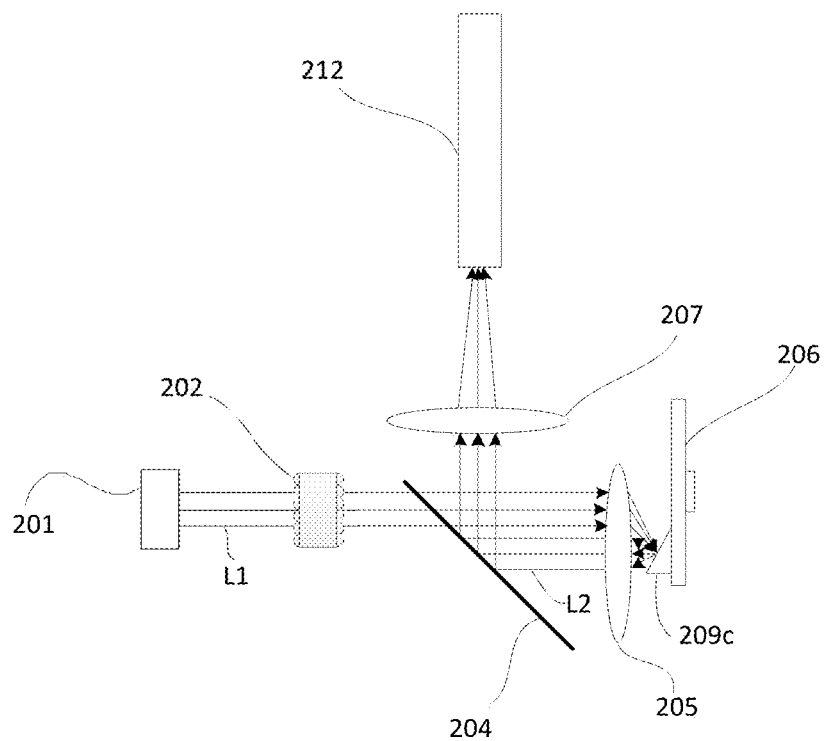
FIG. 8 is a structural schematic diagram of a light source device according to Embodiment 4 of the present disclosure.

Referring to FIG. 8, FIG. 8 is a structural schematic diagram of a light source device according to Embodiment 4 of the present disclosure (for clarity of description, the optical path of the excited light L3 in Embodiment 1 is not shown in this embodiment). The light source device includes a first light source 201, a fly-eye lens pair 202, a light guiding system, and a wavelength conversion device 206. The light guiding system includes a first light splitting assembly 204, a collecting lens 205, a relay lens 207, and an optical path correcting assembly 209c. In addition, the light source device further includes an integrator rod 212.

This embodiment is a modified embodiment of Embodiment 1, and the difference from Embodiment 1 is that the optical path correcting assembly 209c in this embodiment is located on the reflective section of the wavelength conversion device 206 (this assembly is not provided in the wavelength conversion section), and the optical path correcting assembly 209c includes a reflective surface. The reflective surface is a part of a conical surface, and it is not parallel with but at an inclination angle with respect to the motion plane of the wavelength conversion device 206, such that the main optical axis of the reflected second exciting light L2 can directly coincide with the main optical axis of the excited light. This technical solution integrates the optical path correcting assembly 209c onto the wavelength conversion device 206, such that the reflective surface of the optical path correcting assembly 209c simultaneously plays a function of the reflective section of the wavelength conversion device 206, which makes the device structure more compact and thus makes the optical path design more flexible and changeable.

In one embodiment, the optical path correcting assembly 209c and a color wheel substrate of the wavelength conversion device 206 are formed into one piece. In another embodiment, the optical path correcting assembly 209c is secured to the wavelength conversion device 206 by bonding or buckling or the like.

Embodiment 5

Figure 9:
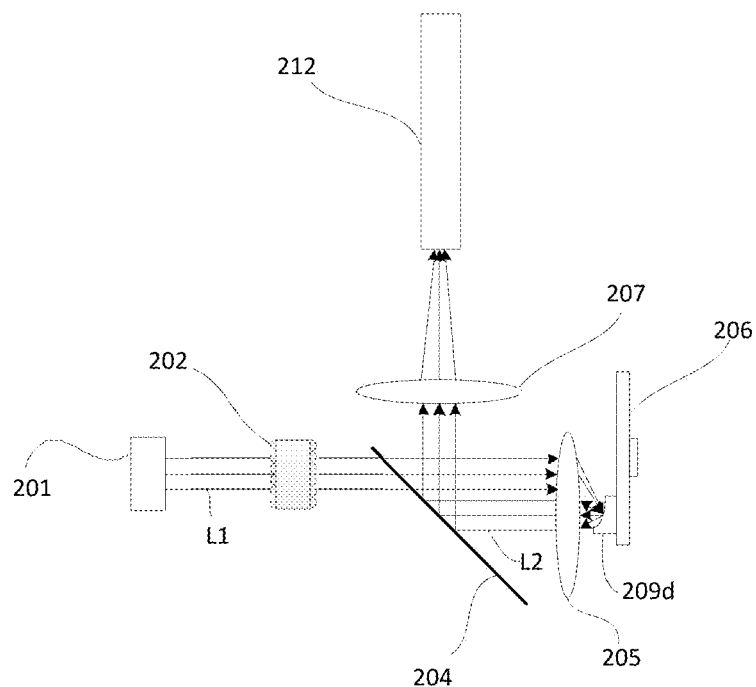
FIG. 9 is a structural schematic diagram of a light source device according to Embodiment 5 of the present disclosure.

Referring to FIG. 9, FIG. 9 is a structural schematic diagram of a light source device according to Embodiment 5 of the present disclosure. The light source device includes a first light source 201, a fly-eye lens pair 202, a light guiding system, and a wavelength conversion device 206. The light guiding system includes a first light splitting assembly 204, a collecting lens 205, a relay lens 207, and an optical path correcting assembly 209d.

This embodiment is a modified embodiment of Embodiment 4. The difference in this embodiment is that the optical path correcting assembly 209d replaces the 209c in FIG. 8, and a reflective surface of the optical path correcting assembly 209d is in a concave curve on an axial cross-section of the wavelength conversion device, which is different from the straight-line type of the 209c.

In this embodiment, since the optical path correcting assembly 209d protrudes from the surface of the wavelength conversion device 206 to make the optical-distance of the second exciting light L2 shorter, it is necessary to add a concave surface to converge it to ensure that the light spots of the second exciting light and the excited light can be imaged at the same position.

Moreover, in the present embodiment, since the second exciting light L2 is converged by the optical path correcting assembly 209d before being incident to the first light splitting assembly 204, a cross-sectional area of the beam is correspondingly reduced, so that the first exciting light L can be closer to the central axis of the collecting lens 205 during the incident process relative to Embodiment 4 or it is less likely to cause the first exciting light L1 and the second exciting light L2 to overlap in Embodiment 5, as compared with Embodiment 4 in the case of the same optical paths of the incident lights.

Embodiment 6

Figure 10A:
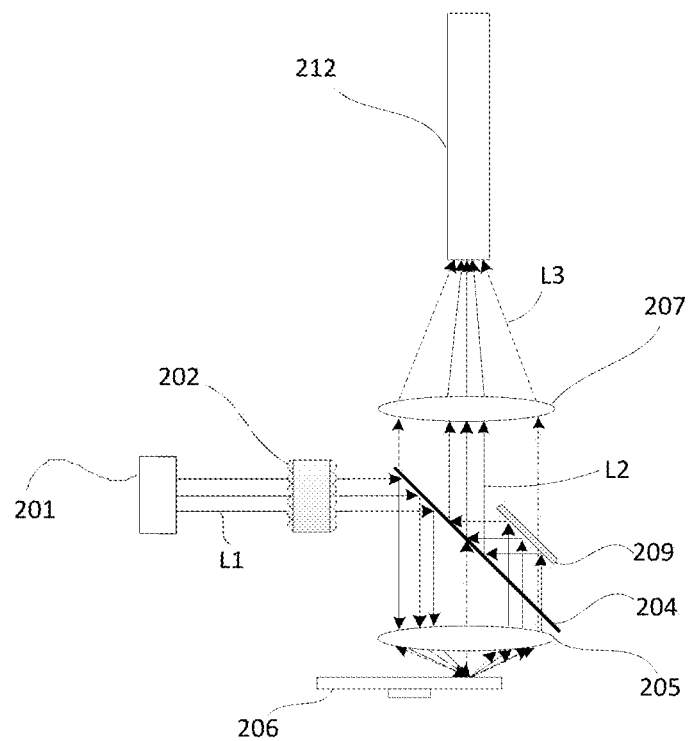
FIG. 10A is a structural schematic diagram of a light source device according to Embodiment 6 of the present disclosure.

Referring to FIG. 10A, FIG. 10A is a structural schematic diagram of a light source device according to Embodiment 6 of the present disclosure. The light source device includes a first light source 201, a fly-eye lens pair 202, a light guiding system, and a wavelength conversion device 206. The light guiding system includes a first light splitting assembly 204, a collecting lens 205, a relay lens 207, and an optical path correcting assembly 209.

In each of the above embodiments, the first exciting light L1 passes through the fly-eye lens pair 202 and is then transmitted through the first light splitting assembly 204 to be incident to the wavelength conversion device 206. In contrast, in the present embodiment, the first exciting light L1 is reflected by the first light splitting assembly 204 and then incident to the wavelength conversion device 206 via the collecting lens 205.

Figure 10B:
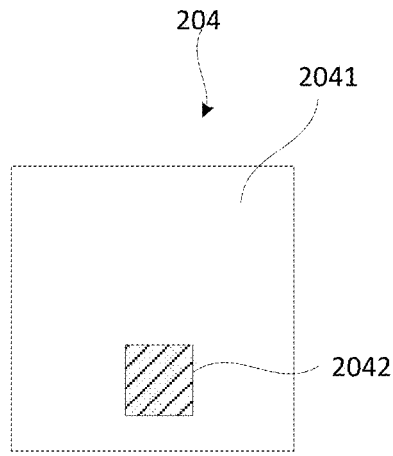
FIG. 10B is a structural schematic diagram of a first light splitting assembly of the light source device in FIG. 10A.

As shown in FIG. 10B, in this embodiment, the first light splitting assembly 204 includes a first region 2041 and a second region 2042. The first region 2041 reflects the first exciting light L1 and transmits the excited light, and the second region 2042 transmits the second exciting light. Specifically, the first exciting light emitted by the first light source 201 is incident to the first region 2041 of the first light splitting assembly 204 and is reflected in this region. Then, it is incident to the collecting lens 205 and converged by the collecting lens 205, and then it is incident to the wavelength conversion device 206. When the reflective section of the wavelength conversion device 206 is located on the optical path of the first exciting light, the first exciting light is incident to the reflective section in such a manner that the main optical axis is obliquely incident, and it is reflected to form the second exciting light L2. The second exciting light L2 forms a "V"-shaped optical path with the first exciting light L1, and it is collected by the collecting lens 205 and transferred to the second region 2042 of the first light splitting assembly 204. After the second exciting light L2 is transmitted through the second region 2042, it is incident to the optical path correcting element 209. The reflective surface of the optical path correcting element 209 reflects the second exciting light and reflects it to the first region 2041 of the first light splitting assembly 204, and this light is then reflected by the first region 2041 into the exiting light channel. When the wavelength conversion section of the wavelength conversion device 206 is located on the optical path of the first exciting light, the wavelength conversion section absorbs the first exciting light and emits excited light, and the excited light is substantially in a Lambertian distribution. After being collected by the collecting lens 205, the excited light is transmitted through the first light splitting assembly 204 and enters the exiting light channel. The second exciting light L2 and the excited light L3 are coincident at a position where the second exciting light is reflected by the first region 2041 of the first light splitting assembly 204.

In this embodiment, the first light splitting assembly 204 has opposite transmission and reflection characteristics on the first exciting light and the excited light, and functions to distinguish the optical paths of the first exciting light from the excited light.

In this embodiment, the portion (i.e., the first region 2041) of the first light splitting assembly 204, that reflects the exciting light, may be a wavelength filter, while the portion (the second region 2042), through which the exciting light is transmitted, may be either a transparent substrate or a through hole.

Figure 10C:
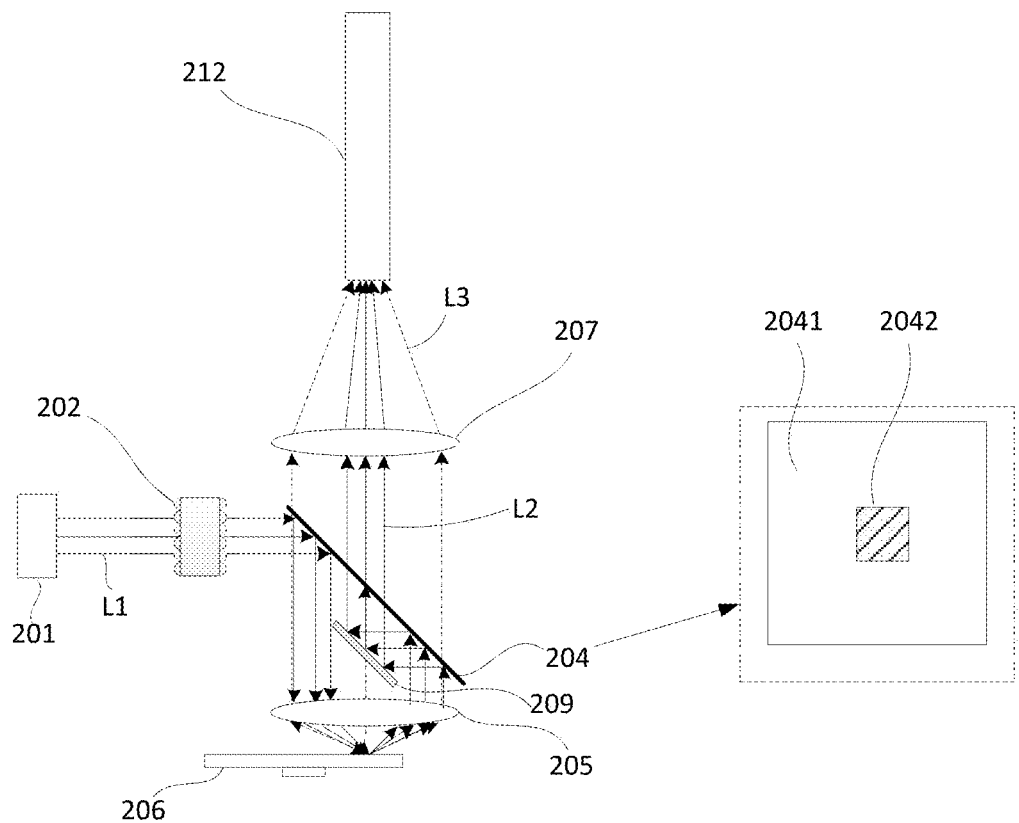
FIG. 10C is a structural schematic diagram of a modified embodiment of the light source device in FIG. 10A.

In a modified embodiment of this embodiment, region division of the first light splitting assembly may also be performed in different manners according to the position change of the optical path correcting assembly. For example, in FIG. 10C, the optical path correcting assembly 209 is located between the first light splitting assembly 204 and the wavelength conversion device 206, and the main optical axis of the second exciting light after being reflected by the optical path correcting assembly 209 coincides with the main optical axis of the excited light, so that the second region of the first light splitting assembly 204, that is used for transmitting the second exciting light, is located at a central position of the first light splitting assembly 204 or located on the optical path of the main optical axis of the excited light. For such a modified embodiment, those skilled in the art can arbitrarily change the configuration according to requirements, and all of them should belong to the technical solution to be protected by the present disclosure.

Embodiment 7

Figure 11:
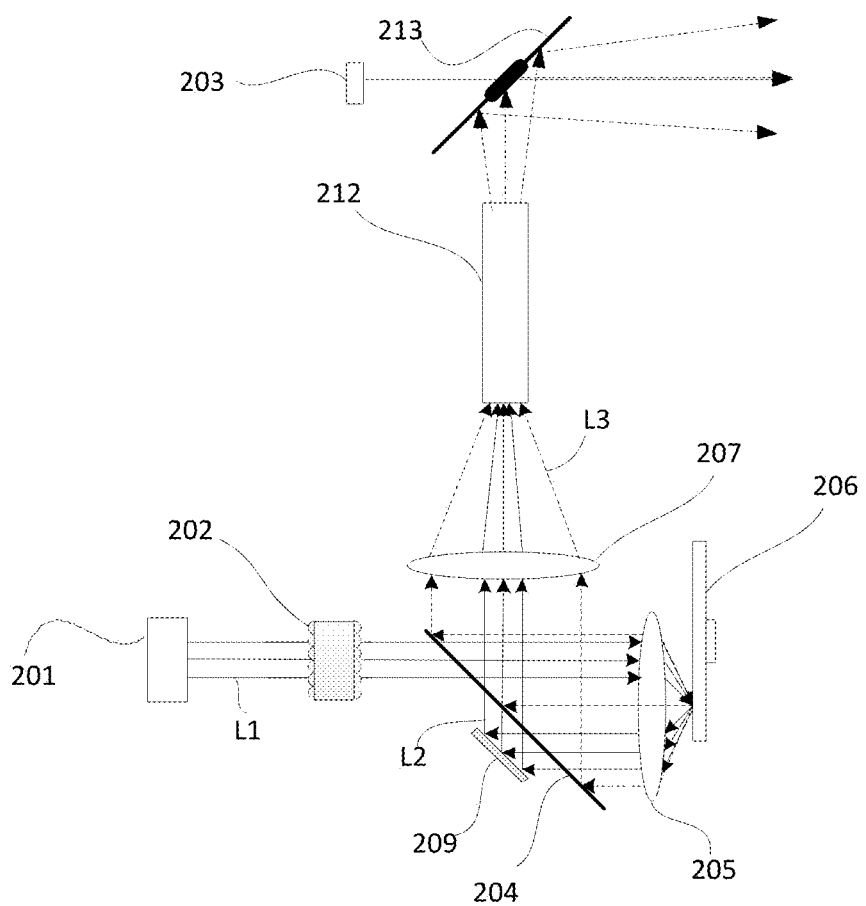
FIG. 11 is a structural schematic diagram of a light source device according to Embodiment 7 of the present disclosure.

Referring to FIG. 11, FIG. 11 is a structural schematic diagram of a light source device according to Embodiment 7 of the present disclosure. The light source device includes a first light source 201, a fly-eye lens pair 202, a light guiding system, and a wavelength conversion device 206. The light guiding system includes a first light splitting assembly 204, a collecting lens 205, a relay lens 207, and an optical path correcting assembly 209. Further, the light source device further includes a second light source 203, and a compensation light guiding assembly 213.

Compared with the above embodiments, a second light source 203 is added in the present embodiment, and it is used for emitting compensation light when the wavelength conversion section of the wavelength conversion device 206 is on the optical path of the first exciting light L1.

In one embodiment, the compensation light has a wavelength range that overlaps with the excited light. For example, the wavelength range of the compensation light is (a, b), and the wavelength range of the excited light is (c, d), where c<a<d. In one embodiment, a color of the compensation light may be the same or similar to that of the excited light. The compensation light can be used to compensate for at least one of hue, brightness, and the like of the excited light. For example, in a specific embodiment, the second light source 203 is a red laser light source, and the wavelength conversion device 206 includes a reflective section, a green wavelength conversion section, and a red wavelength conversion section. When the red wavelength conversion section is on the optical path of the first exciting light, the second light source 203 is turned on, so that the red laser and the red excited light are emitted together, thereby achieving that the red light emitted from the light source device is closer to the required red color while increasing the brightness of the red light and enlarging the color gamut of the light source device.

This embodiment is equivalent to the case where a second light source that emits the compensation light is added after the light source device of each of the above embodiments forms the emitted light, such that the compensation light is combined with the emitted light to achieve an effect of improving the brightness and the color.

In this embodiment, the compensation light guiding assembly 213 is disposed on the exiting optical path of the excited light. Specifically, it is disposed on the exiting optical path of the integrator rod 212, and the excited light and the compensation light are respectively incident to the compensation light guiding assembly 213 from two directions, to be combined into one beam. The compensation light guiding assembly 213 can be implemented by providing a small transmitting region on a reflective substrate as shown in the drawing. The compensation light is incident to the small transmitting region and transmitted, and the excited light covers most of the region of the compensation light guiding assembly 213. Except that a small amount of the light is transmitted through the small transmitting region and lost, the remaining most of the light is reflected by the compensation light guiding assembly 213. Further, it is also possible to make the small transmitting region transmit only the light of the wavelength range of the compensation light and reflect the light of other wavelength ranges, to reduce the light loss. In one embodiment, the transmission and reflection characteristics of the compensation light guiding assembly 213 on the excited light and the compensation light can also be exchanged, and this technical solution can be achieved by providing a compensation light reflective region on a transparent substrate.

In this embodiment, the compensation light emitted by the second light source 203 is combined with the excited light at a position after the excited light is formed, such that the light loss, caused by the compensation light being incident to the wavelength conversion device and being scattered by the wavelength conversion device, is avoided, thereby greatly improving a light utilization rate of the compensation light.

The distinguishing feature of the present embodiment with respect to Embodiment 1 can also be combined with the other embodiments described above to achieve the same technical effects, which will not be described herein again.

It can be understood that, based on the above embodiments, the position where the compensation light and the excited light are combined can also be advanced, such that the compensation light is incident to the wavelength conversion section of the wavelength conversion device, and the compensation light that has been reflected by the wavelength conversion section to form a Lambertian distribution is directly combined with the excited light, which will not be described again here.

The present disclosure also provides a projection system, and the projection system includes the light source device in each of the above embodiments, and further includes a light modulating device and a lens device. By projecting the light emitted by the light source device on a light modulator of the light modulating device and modulating the spatial distribution of the light according to an input image signal, the modulated light is emitted by a lens device to form an image, thereby realizing a projection display function.

The projection display system of the present disclosure can be applied to projectors such as cinema projectors, engineering projectors, pico-projectors, educational projectors, wall projectors, laser televisions, etc., and it can also be applied to image lighting such as image projection lamps, transportation (vehicles, ships and airplanes) lights, searchlights, stage lights and the like.

The embodiments described in this specification are only part of the embodiments of the present disclosure, and not all of the embodiments. All other embodiments obtained by those of ordinary skill in the art based on the embodiments of the present disclosure without creative efforts, and feasible technical solutions consisting of some or all of the technical features of any two or more embodiments of the present application are within the scope of the present disclosure.

The various embodiments in this specification are described in a progressive manner. Each embodiment focuses on the differences from other embodiments, and the same and similar parts between the various embodiments may be referred to each other.

The above description is only embodiments of the present disclosure and does not limit the patent scope of the present disclosure. All equivalent structures or equivalent process transformations made using the specification and the drawings of the present disclosure and those directly or indirectly applied in other related technical fields are included in the scope of patent of the present disclosure.

What is claimed is:

1. A light source device, comprising a first light source, a fly-eye lens pair, a light guiding system, and a wavelength conversion device; wherein
    the first light source is configured to emit first exciting light which is homogenized by the fly-eye lens pair and then incident to the light guiding system;
    the light guiding system is configured to guide the first exciting light to the wavelength conversion device;
    the wavelength conversion device comprises a wavelength conversion section and a reflective section and periodically moves in such a manner that the wavelength conversion section and the reflective section are periodically located on an optical path of the first exciting light in different time divisions, wherein the wavelength conversion section absorbs the first exciting light and emits excited light, and the first exciting light is obliquely incident to a surface of the reflective section and is reflected to form second exciting light;
    the light guiding system is further configured to collect the excited light and the second exciting light, and to guide the excited light and the second exciting light to exit along an exiting light channel;
    the light guiding system comprises an optical path correcting assembly located on an optical path of the second exciting light and configured to reflect the second exciting light in such a manner that a main optical axis of the reflected second exciting light coincides with that of the excited light; and
    the fly-eye lens pair comprises a first lens array and a second lens array that are sequentially disposed along a direction of the first exciting light, wherein lens units constituting the first lens array are configured to perform imaging with overlap on a surface of the wavelength conversion device.

2. The light source device according to claim 1, further comprising a beam angle reflective sheet located on an optical path between the first light source and the fly-eye lens pair, wherein an included angle between the first exciting light reflected by the beam angle reflective sheet and an axis of the fly-eye lens pair is greater than 0° and smaller than or equal to 2°.

3. The light source device according to claim 1, wherein the light guiding system further comprises a collecting lens for converging the first exciting light onto the wavelength conversion device and collecting the excited light and the second exciting light from the wavelength conversion device; and
    wherein a distance between an edge of a beam of the first exciting light incident to the collecting lens and a central axis of the collecting lens is in a range of 0.2 to 0.5 mm.

4. The light source device according to claim 1, further comprising a filter wheel comprising a scattering-transmitting section, wherein when the second exciting light exits from the reflective section of the wavelength conversion device, the scattering-transmitting section is located on an optical path of the second exciting light and used for scattering the second exciting light.

5. The light source device according to claim 4, wherein the filter wheel further comprises a color-retouching transmitting section to change color of the excited light.

6. The light source device according to claim 5, wherein the filter wheel moves periodically so that respective sections of the filter wheel are in one-to-one correspondence with respective sections of the wavelength conversion device.

7. The light source device according to claim 5, wherein the scattering-transmitting section is provided with a scattering sheet of a Top-hat type or a single-row fly-eye structure arranged in a hexagon.

8. The light source device according to claim 1, wherein the optical path correcting assembly comprises an angular distribution correcting element for converging or diverging the second exciting light in such a manner that imaging positions of the second exciting light and the excited light coincide in a direction of beam propagation.

9. The light source device according to claim 8, wherein the optical path correcting assembly comprises a concave reflective surface, and wherein from the wavelength conversion device to a position where the second exciting light and the excited light coincide, an optical-distance of the second exciting light is smaller than that of the excited light.

10. The light source device according to claim 8, wherein the optical path correcting assembly comprises a combination of a planar reflective surface and a convex lens, and wherein from the wavelength conversion device to a position where the second exciting light and the excited light coincide, an optical-distance of the second exciting light is smaller than that of the excited light.

11. The light source device according to claim 8, wherein the optical path correcting assembly comprises a convex reflective surface, and wherein from the wavelength conversion device to the position where the second exciting light and the excited light coincide, the optical-distance of the second exciting light is larger than that of the excited light.

12. The light source device according to claim 8, wherein the optical path correcting assembly comprises a combination of a planar reflective surface and a concave lens, and wherein from the wavelength conversion device to the position where the second exciting light and the excited light coincide, the optical-distance of the second exciting light is larger than that of the excited light.

13. The light source device according to claim 1, wherein the optical path correcting assembly is fixed on the reflective section of the wavelength conversion device and used for reflecting the first exciting light to form the second exciting light.

14. The light source device according to claim 13, wherein the optical path correcting assembly is in a concave curve or a straight-line shape on an axial cross-section of the wavelength conversion device.

15. The light source device according to claim 1, further comprising a second light source for emitting compensation light and a compensation light guiding assembly disposed on an exiting optical path of the excited light, wherein wavelength range of the compensation light overlaps with that of the excited light, and the compensation light and the excited light are combined by the compensation light guiding assembly.

16. A projection system comprising a light source device, a light modulating device and a lens device,
wherein the light source device comprises a first light source, a fly-eye lens pair, a light guiding system, and a wavelength conversion device; wherein
the first light source is configured to emit first exciting light which is homogenized by the fly-eye lens pair and then incident to the light guiding system;
the light guiding system is configured to guide the first exciting light to the wavelength conversion device;
the wavelength conversion device comprises a wavelength conversion section and a reflective section and periodically moves in such a manner that the wavelength conversion section and the reflective section are periodically located on an optical path of the first exciting light in different time divisions, wherein the wavelength conversion section absorbs the first exciting light and emits excited light, and the first exciting light is obliquely incident to a surface of the reflective section and is reflected to form second exciting light;
the light guiding system is further configured to collect the excited light and the second exciting light, and to guide the excited light and the second exciting light to exit along an exiting light channel;
the light guiding system comprises an optical path correcting assembly located on an optical path of the second exciting light and configured to reflect the second exciting light in such a manner that a main optical axis of the reflected second exciting light coincides with that of the excited light; and
the fly-eye lens pair comprises a first lens array and a second lens array that are sequentially disposed along a direction of the first exciting light, wherein lens units constituting the first lens array are configured to perform imaging with overlap on a surface of the wavelength conversion device.

17. The projection system according to claim 16, further comprising a beam angle reflective sheet located on an optical path between the first light source and the fly-eye lens pair, wherein an included angle between the first exciting light reflected by the beam angle reflective sheet and an axis of the fly-eye lens pair is greater than 0° and smaller than or equal to 2°.

18. The projection system according to claim 16, wherein the light guiding system further comprises a collecting lens for converging the first exciting light onto the wavelength conversion device and collecting the excited light and the second exciting light from the wavelength conversion device; and
wherein a distance between an edge of a beam of the first exciting light incident to the collecting lens and a central axis of the collecting lens is in a range of 0.2 to 0.5 mm.

19. The projection system according to claim 16, further comprising a filter wheel comprising a scattering-transmitting section, wherein when the second exciting light exits from the reflective section of the wavelength conversion device, the scattering-transmitting section is located on an optical path of the second exciting light and used for scattering the second exciting light.

20. The projection system according to claim 16, wherein the optical path correcting assembly comprises an angular distribution correcting element for converging or diverging the second exciting light in such a manner that imaging positions of the second exciting light and the excited light coincide in a direction of beam propagation.

* * * * *